United States Patent [19]
Drori

[11] 4,295,963
[45] Oct. 20, 1981

[54] BACKWASHABLE FLUID FILTER

[76] Inventor: Mordeki Drori, 89 Zahal St., Kiron, Israel

[21] Appl. No.: 119,388

[22] Filed: Feb. 7, 1980

[30] Foreign Application Priority Data
Feb. 15, 1979 [IL] Israel ..................................... 56682

[51] Int. Cl.³ ............................................ B01D 29/38
[52] U.S. Cl. .................................... 210/108; 210/411
[58] Field of Search ............... 210/107, 108, 391, 393, 210/411, 358

[56] References Cited
U.S. PATENT DOCUMENTS
| | | | |
|---|---|---|---|
| 3,717,252 | 2/1973 | Picard | 210/108 |
| 4,042,504 | 8/1977 | Drori | 210/108 X |
| 4,045,345 | 8/1977 | Drori | 210/108 X |

FOREIGN PATENT DOCUMENTS
| | | | |
|---|---|---|---|
| 2054291 | 5/1971 | Fed. Rep. of Germany | 210/108 |
| 2517635 | 11/1976 | Fed. Rep. of Germany | 210/108 |

*Primary Examiner*—John Adee
*Attorney, Agent, or Firm*—Benjamin J. Barish

[57] ABSTRACT

A backwashable filtering device is described including a backwash nozzle and means for effecting relative movement between it and the filter body, and further including a valve assembly movable to open or close the passage between the filter body and the housing outlet in response to low pressure conditions, thereby to maintain the pressure for backwashing the filter body via the nozzle.

Also described is the provision of a sleeve axially movable to open or close a passage between the housing inlet and the filter body, which sleeve is movable either manually or automatically in response to pressure or other specified condition.

15 Claims, 8 Drawing Figures

BACKWASHABLE FLUID FILTER

BACKGROUND OF THE INVENTION

The present invention relates to backwashable filtering devices which are cleaned by backwashing or backflushing the fluid feed through the filter. The present invention is particularly useful in the in-line type of backwashable filtering device such as described in my prior patent application Ser. No. 74,525 filed Sept. 11, 1979, and Ser. No. 92,583 filed Nov. 8, 1979, and also in my prior U.S. Pat. Nos. 4,042,504 and 4,045,345, and is therefore described below with respect to this type of filtering device.

The above-cited patents and applications both relate to backwashable filtering devices including a housing having an inlet connectable to an upstream fluid pipe and an outlet connectable to a downstream fluid pipe, a filter body having an upstream surface communicating with the housing inlet to intercept dirt particles in the fluid flowing in the foreward direction from the housing inlet to the housing outlet, a backwash nozzle within the housing and having a nozzle inlet disposed adjacent to the upstream surface of the filter body, means for effecting relative movement between the filter body and the backwash nozzle, and means for connecting the backwash nozzle to the atmosphere for backwashing the filter body. This type of backwashable filtering device operates quite well when the line pressure is relatively high, e.g. over about 1.5 or 2 atmospheres. There are many systems, however, where the line pressure is relatively low such that when the backwash nozzle is connected to the atmosphere for backwashing the filter body, the outlet pressure may be insufficient to effect the backwashing of the filter body.

BRIEF SUMMARY OF THE INVENTION

According to one aspect of the present invention, there is provided a backwashable filtering device of the foregoing type which device further includes; a valve assembly moveable to open or close a passage between the filter body and the housing outlet, spring means tending to move the valve assembly to close said passage, and pressure means for applying to the valve assembly the pressure at a point upstream of the valve assembly tending to move same to open said passage, whereby under low pressure conditions the valve assembly closes or restricts said passage to the outlet and thereby maintains the pressure for backwashing the filter body via the nozzle.

According to another aspect of the invention, there is provided a backwashable filtering device of the foregoing type, wherein the housing further includes a sleeve axially movable to open or close a passage between the housing inlet and the filter body. In one described embodiment, the sleeve is axially movable by a manually rotatable knob coupled to the sleeve. In a second described embodiment, the sleeve is axially movable by a piston displaceable in a cylinder, the device further including means for subjecting one face of the piston to atmospheric pressure tending to move the sleeve to open the passage between the housing inlet and the filter body, a control member for subjecting the opposite face of the piston either to the housing inlet pressure tending to move the sleeve to close the said latter passage or to atmospheric pressure, and means effective to move the sleeve to open the latter passage when the control device subjects said opposite face of the piston to atmospheric pressure.

Further features and advantages of the invention will be apparent from the description below.

BRIEF DESCRIPTION OF THE DRAWINGS

The invention is herein described, by way of example only, with reference to the accompanying drawings, wherein.

and

Figure 6:
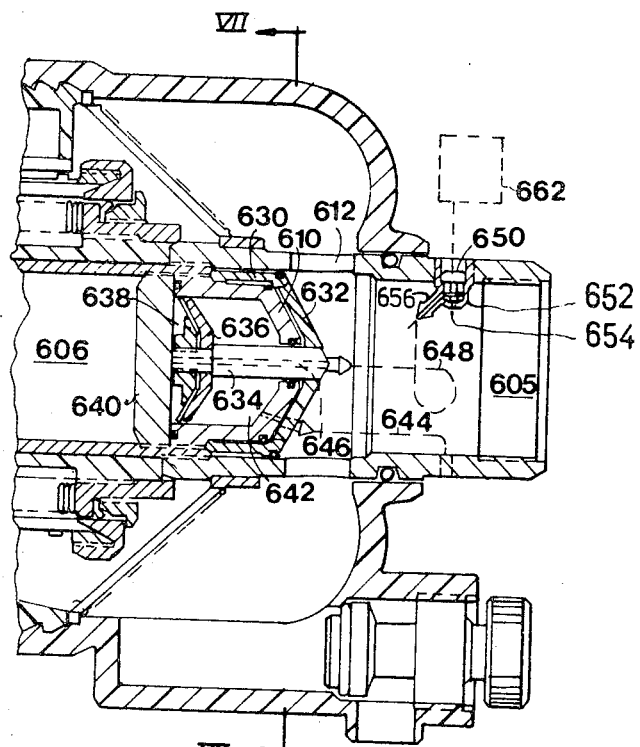
FIG. 6 is a fragmentary view illustrating a modification in the deviced FIG. 1.
Figure 8:
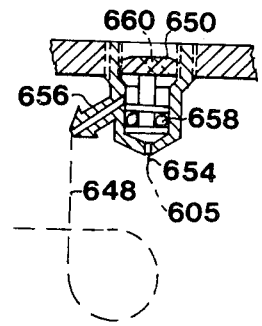

FIG. 8 is an enlarged view illustrating the control member in the device of FIG. 6.

DESCRIPTION OF PREFERRED EMBODIMENTS

The backwashable filtering device illustrated in the drawings is of the in-line type described in my patent application Ser. No. 92,583. It includes a housing comprising an inner tubular section 402 constituted of a rigid metal tube 403 and a plastic body 404 bonded thereto. The opposite ends of metal tube 403 serve as the inlet 405 and outlet 406 of the filter housing, and are adapted to be threadedly attached to the upstream and downstream pipes (not shown). A conical deflector 410 integrally molded with the plastic body 404 is fixed within the inner metal tube between one group of holes 412, and a second group of holes 414 formed therethrough at longitudinally-spaced locations. Holes 412 thus define a passage from the inlet 405 to the filter within the housing, and holes 414 define a passage from the filter to the outlet 406.

The filter housing further includes an outer cylindrical section 416 which is radially spaced from the inner tubular section 402. The downstream (left) end of housing section 416 is formed with a bore 417 receiving the respective end of the inner housing section 402. The upstream (right) end of housing section 416 is closed by a collar 418 threaded at 419, which collar is formed with a bore receiving the respective end of the inner housing section 402. The two ends of the outer housing section 416 are sealed by seals 420, 422, with respect to the inner housing section 402.

A first filter body 424, of substantially cylindrical or tubular configuration, is disposed in the space between and coaxial with the tubular inner housing section 402 and the outer housing section 416. Filter body 424 includes a filter screen 425 embedded in plastic and formed with inner ribs 426 (FIGS. 1 and 2) extending axially along the screen, and outer ribs 426' extending circumferentially around the screen. One end (right) of the plastic portion of filter body 424 is formed with threads receiving a collar 427 having a flat inner surface. The collar 427 end of the filter body 424, and the opposite end of the filter body, are rotatably mounted with respect to the housing on plastic bearing seals 428 secured to the inner housing section by threaded collars 429.

Figure 5:
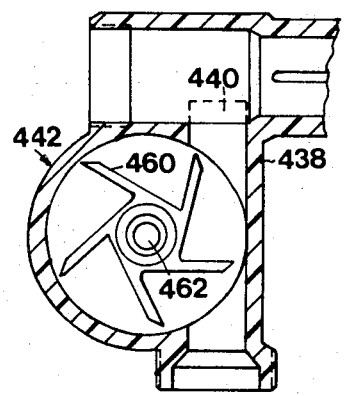
FIG. 5 is a sectional view along lines V—V of FIG. 3.
Figure 2:
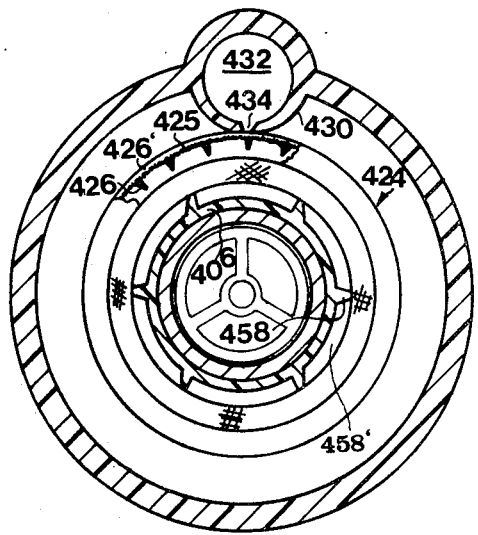
FIGS. 2-4 are sectional views, along lines II—II, III—III, and IV—IV, respectively, of FIG. 1.
Figure 3:
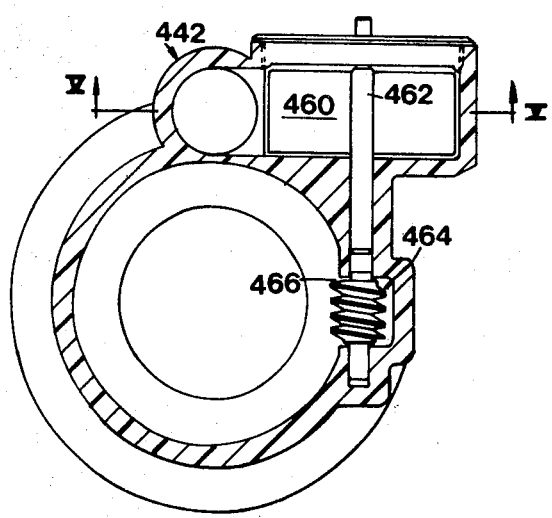
Figure 4:
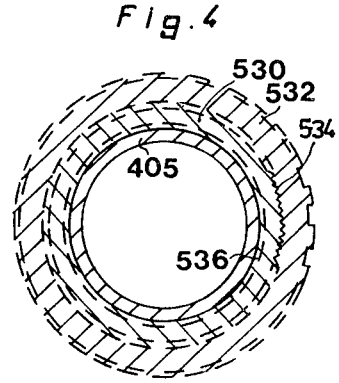

The outer cylindrical housing section 416 is provided with an inwardly-depending curved wall 430 (FIG. 2) defining a purging chamber 432 having a narrow inlet opening 434 adjacent to, and extending the complete length of, the outer cylindrical surface of the filter screen 425 of filter body 424. Purging chamber 432 with its narrow inlet 434 serves as a backwash nozzle which is effective to clean the upstream (outer) cylindrical surface of filter body 424 as the latter is rotated with respect to the housing, as will be described more particularly below. One end of backwash nozzle 432 communicates with a purging conduit 438 (FIG. 5) via an opening or passageway 440 which leads to a fluid (hydraulic) drive unit 442 (FIGS. 3 and 5) carried by housing section 416. Opening 440 is normally closed by a valve member 446 (FIG. 1), but may be opened (e.g. by known automatic or manual means) to connect the backwash nozzle 432 to the atmosphere and thereby to permit fluid (water) to backflush through the filter body 424 and the backwash nozzle. This also causes the drive unit 442 to rotate (by the kinetic energy in the backwash fluid) the filter body 424 with respect to the fixed backwash nozzle 432 which thereby backwashes the complete upstream (outer) surface of the filter screen 425 of filter body 424.

Since it is desirable to space the inlet opening 434 of the backwash nozzle 432 as close as possible to the filter body 424, there is a danger that a particle will become wedged between the mouth of nozzle 432 and the outer surface of body 424, which particle may rupture the filter screen during its rotation with respect to the nozzle. For this reason a second filter body 450 is disposed within the housing on the downstream side of the backwashable filter body 424, which second filter body is effective to intercept any particles present in the water as a result of the rupture or other failure of the backwashable filter body 424.

Figure 1:
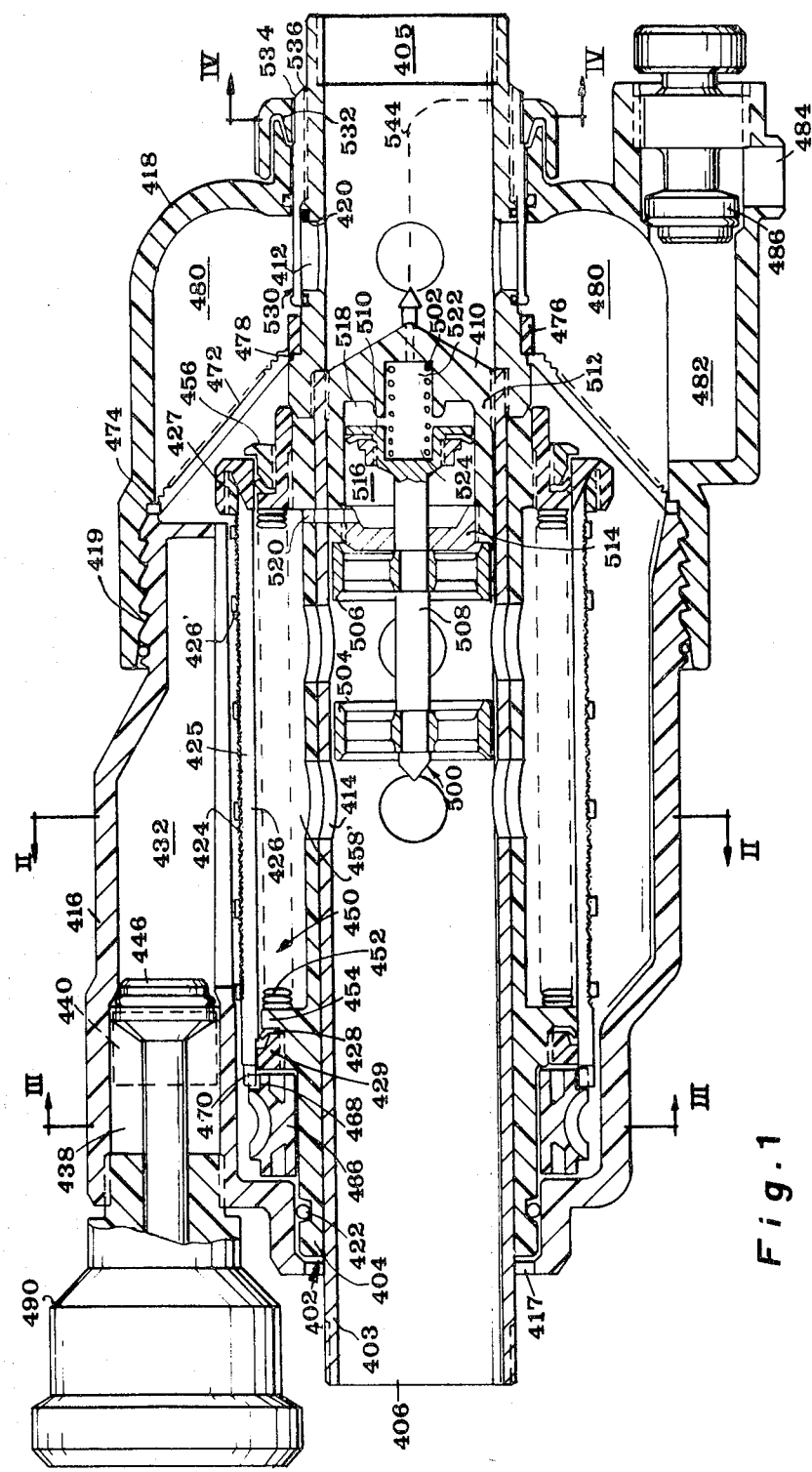
FIG. 1 is a longitudinal section view of one form of backwashable filtering device constructed in accordance with the present invention.

The second filter body 450 is constituted of a plurality of discs 452 fixed to the inner housing section 402 within the outer rotatable screen filter 424. The filter discs 452 are of a known type and include ribbed side faces which effect the filtering action when the discs are compacted together in stacked side-by-side relationship as illustrated in FIG. 1. In this case discs 452 are compacted between an annular shoulder 454 integrally formed on the plastic body 404, and a collar 456 threaded onto the plastic body. Shoulder 454 is also used for securing, between it and one of the threaded collars 429, the plastic bearing seal 428 at one side of the housing; and collar 456 is similarly used for fixing between it, and the other collar 429, the plastic bearing seal 428 on the opposite side of the housing. The plastic body 404 is further formed with axially-extending spacing ribs 458 (FIG. 2) engaging the inner surfaces of the filter discs 452, thereby defining a space 458' between the inner face of the latter and the outer face of the underlying portion of the housing outlet tube 406.

The filter-screen body 424 is rotated between the fixed filter-disc body 450 and the fixed backwash nozzle 432 by means of the previously-mentioned hydraulic drive unit 442 actuated by the kinetic energy in the fluid flowing through the backwash nozzle 432. Thus, as shown particularly in FIGS. 3 and 5, the dirty water entering the hydraulic drive unit 442, when valve 446 (FIG. 1) is open, impinges blades 460 fixed at one end of a rotor shaft 462, whose opposite end is formed as a worm 464 meshing with a gear 466. The latter gear is formed with teeth 468 (FIG. 1) along its circumference facing the filter-screen body 424, which body is similarly formed with teeth 470 interfitting with teeth 468 to thereby effect a rotary coupling between gear 466 and the filter-screen body 424. This coupling is easily separable and does not require dimensional precision since it permits some axial movement of one coupled part with respect to the other.

The illustrated device further includes a coarse conical screen 472 fixed between the housing inlet 405 and the filter-screen body 424 for intercepting coarse particles in the fluid before reaching filter body 424. Conical screen 472 is fixed coaxial with inlet 405 and filter body 424 by being clamped, at its outer end, between a shoulder 474 formed at the outer end of housing collar 418 and the open end of housing section 416, while the inner end of the conical filter 472 is clamped between a nut 476 threaded onto plastic body 404 of the housing, and a shoulder 478 formed in the plastic body.

The inlet openings 412, through which the water is inletted into chamber 480 defined by the coarse conical screen 472 and the housing collar 418, are preferably formed radially through the inlet tube 402 to minimize pressure drop, but may be formed substantially tangential to it to impart a cyclonic motion to the water in chamber 480, and thereby to cause the upstream (right) surface of the coarse conical filter 472 to be continuously washed of the coarse particles intercepted by the filter.

A further chamber 482 is formed at the lower end of chamber 480 to accumulate the coarse particles intercepted by and washed from the conical screen 472. Chamber 482 also accumulates the heavy particles in the inletted water which tend to move outwardly in chamber 480 and thereby into chamber 482. Chamber 482 is provided with a discharge port 484 closed by a valve 486 which may be opened (manually or automatically) for discharging the particles accumulated in the chamber.

As indicated earlier, such a backwashable filtering device operates quite satisfactorily so long as the line pressure is sufficiently high so that when the backwash nozzle is connected to the atmosphere for backwashing the filter, the outlet pressure is sufficient to effect the rotation and backwashing of the filter body.

To enable the described filtering device to operate also under low line-pressure conditions, it is provided with a valve assembly, generally designated 500, movable to open, close, or restrict the passage (namely, openings 414) between the filter bodies 424 and 450 and the housing outlet 406. A spring 502 tends to move the valve assembly 500 to close openings 414, but the assembly is applied with pressure from a point upstream of it tending to open the passage 414. Accordingly, under low pressure conditions, the valve assembly 500 closes the passage (openings 414) to the outlet 406, and thereby maintains the pressure for backwashing the nozzle.

More particularly, valve assembly 500 includes a pair of annular rings 504, 506 fixed to one end of a stem 508, the opposite end of the stem being fixed to a piston 510 movable within a cylinder formed in the conical deflector 410. The annular wall 512 of deflector 410 is elongated for this purpose and is closed at the opposite end of the deflector by an end wall 514 formed with a central opening through which the stem 508 passes.

Piston 510 thus defines two chambers 516 and 518 on its opposite faces. Chamber 516 communicates, via passage 520, with the space 458' formed by the spacing ribs 458 (FIG. 2) engaging the inner surfaces of the filter discs 450 to space the latter from the outer face of the underlying portion of the housing outlet tube 406. Chamber 518, at the opposite face of piston 510, includes the previously-mentioned spring 502, the latter being seated between sockets 522 and 524 formed in the respective confronting faces of the conical deflector 410 and piston 510.

In the illustrated embodiment of the invention, there are two annular series of openings 414 axially-spaced from each other, and therefore the valve assembly 500 includes two axially-spaced annular rings 504, 506 for closing these openings when the valve member is in its closed position.

The illustrated filtering device further includes a sleeve 530 which is axially movable by a manually rotatable knob 532 to close the openings 412 defining the passageway from the inlet 405 to the filter bodies 424, 450. Knob 532 is formed on its inner face with a plurality of ribs 534 receivable in recesses formed on the outer face of sleeve 530, as shown particularly in FIG. 5. The inner face of sleeve 530 is formed with internal threads 536 receivable on external threads formed in the inlet end 405 of the tubular housing section 402.

It will thus be seen that spring 502 normally urges the valve assembly 500 leftwardly, i.e. causing its annular rings 504, 506 to close or restrict the two series of openings 414 defining the passage from the filter bodies 424, 450 to the housing outlet 406. Valve assembly 500, however, is urged in the opposite direction, i.e. to open this passage, by the pressure within space 458' just downstream of the filter bodies 424, 450.

Thus, so long as the pressure within this space 458' is above a predetermined level, e.g., above 1.5 atmospheres as determined by spring 502, this pressure will move the valve assembly 500 (to the position illustrated in FIG. 1) wherein its annular rings 504, 506, open passages 414, permitting the normal operation of the filter as described above. However, should the outlet pressure drop below a predetermined level which would be insufficient to effect the rotation and the backwashing of the filter body 424 via backwash nozzle 432, the drop in pressure is sensed by piston 510 via passage 520, leading from space 458' to the piston chamber 516, whereupon the counter-force within chamber 516 is insufficient to prevent spring 502 from moving the valve assembly 500 to cause its annular rings 504, 506, to close or restrict passages 414.

It will thus be seen that under such low pressure conditions, valve assembly 500 closes or restricts the passage 414 to the outlet 406 and thereby maintains the pressure for backwashing the filter. It is not necessary to provide seals with respect to opennings 414 and rings 504, 506, since it is not essential that these rings completely shut-off the flow through the outlet 406.

However, should it be desired to completely terminate the flow of the fluid through the filter, this may easily be done by merely rotating knob 532 which, being keyed to sleeve 530 via its ribs 534, causes sleeve 530 to advance by its threads 536 to close the openings 412 defining the passage between the housing inlet 405 and the filter bodies. Seal 420 at one side of the opening and a corresponding seal at the other side would then completely shut-off the flow through the filter. Whenever it may be desired to disassemble the filter, knob 532 may be detatched from sleeve 530 by merely moving the knob axially of the sleeve, whereupon the remainder of the device may be disassemble as described for example in the above-cited patent application Ser. No. 92,583.

As mentioned earlier, valve member 446 (FIG. 1), which is actuated to uncover opening 440 to effect the backwashing of the filter body 424, may be manually or automatically controlled. It may be automatically controlled by using a known-type of sensor 490 which senses the differential pressure between a point upstream of the filter body to be backwashed, and a point downstream of it, to thereby indicate, by the pressure difference, the amount of dirt accumulated on the filter body. When this pressure difference reaches a predetermined value, the sensor actuates the valve member 446 to uncover opening 440, and thereby to connect the backwash nozzle 432 to the atmosphere for backwashing the filter 424 as well as for rotating it as described above. When such a sensor is used, it would be preferable to apply to one input the pressure on the downstream side of the conical filter 472 (i.e. upstream of filter 424), and to its other input the pressure within space 458', which would provide an indication of the amount of dirt accumulated on the filter bodies 424 and 450. As a practical matter, virtually all the dirt will be accumulated on the outer filter (screen) body 424, as the inner filter (disc) body 450 is mainly provided as a safety measure in case of rupture of filter 424. When the pressure inputs to the sensor 490 are as described above, the sensor will automatically maintain valve member 446 closed, even under starting-up conditions or under low linepressure conditions, until the pressure drop across the filter body rises to a predetermined level, by the accumulation of dirt, to effect the backwashing operation.

In some cases, it may be desirable to have the valve assembly 500 controlled by the sensor 490, such that whenever the sensor actuates valve member 446 to uncover opening 440 (and thereby to initiate a backwashing operation), the valve assembly 500 will be actuated to close or restrict passages 414. For such an operation, it is only necessary to connect chamber 516 on one side of piston 510 to nozzle chamber 432, or to another pressure-point which is vented to the atmosphere when valve member 446 is actuated to uncover opening 440 initiating the backwashing operation. In such an arrangement, the filter would be substantially disabled from filtering the fluid during the backwashing operation, as distinguished from the previously-described arrangements wherein the filter continues to filter the fluid through its filtering surfaces except where it is being scanned by the backwash nozzle.

Figure 7:
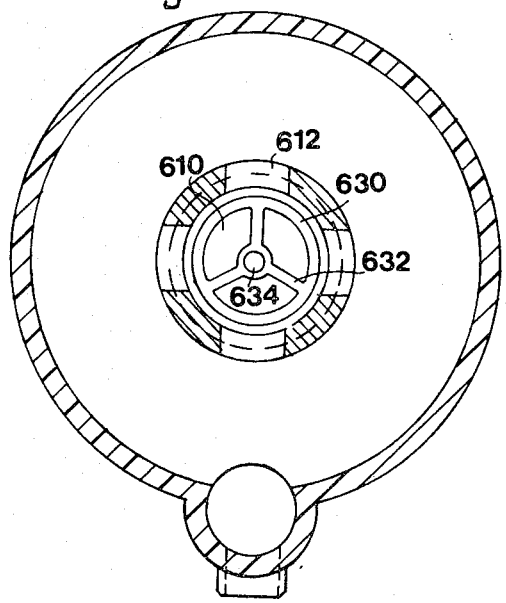
FIG. 7 is a sectional view along lines VII—VII of FIG. 6.

FIGS. 6-8 illustrate a modification in the device of FIG. 1 permitting automatic closing of the filter inlet by the axially-movable sleeve at the inlet passage. In this case, the sleeve, designated 630 in FIG. 6, is carried by a plurality (e.g. three) radial ribs 632 which are in turn fastened to one end of a stem 634 passing through the conical deflector 610. The deflector is fixed within the tubular section of the housing between the housing outlet 606 and openings 612 defining the passage from the inlet 605 to the filter bodies. The opposite end of stem 634 is fixed to a piston 636 movable within a cylinder defined by the annular wall of deflector 610. Piston 636 thus defines a first chamber 638 with end wall 640, and a second chamber 642 with the inner face of conical deflector 610. Chamber 642 is vented to the atmosphere via a tube 644. Chamber 638 is connected, via a bore 646 formed through stem 634 and a tube 648, to a control member 650 threaded into a socket 652 in the tubular section of the filter housing adjacent to its inlet 605. The bottom of socket 652 is provided with a bore 654 exposed to the inlet 605, and is further formed with a connection 656 for tube 648 at a higher point within the socket. Control member 650 carries a seal 658 at its lower end. Its upper end is formed with an enlarged head having another bore 660.

It will thus be seen that when control member 650 is threaded to its lower position, as illustrated in FIG. 8, it will connect tube 648 to the atmosphere via bore 660. Accordingly, atmospheric pressure will be applied via connection 656, tube 648, and bore 646 to chamber 638 at the left side of piston 636. Since chamber 642 at the opposite side of piston 636 is also connected to the atmosphere via tube 644, the inlet pressure applied to the exposed surfaces of ribs 632, sleeve 630, and stem 634 will be sufficient to move piston 636, and thereby sleeve 630 carried with it, leftwardly to uncover openings 612 serving as the passage from the inlet 605 to the filter bodies. To close the passage defined by openings 612, control member 650 would be threaded upwardly, whereupon chamber 638 would be connected to the inlet pressure via bore 646, tube 648, connection 656, and bore 654, thereby moving piston 636 rightwardly, causing it to move sleeve 630 to close openings 612.

If desired to control the opening and closing of passage 612 in an automatic manner, control member 650 may be connected to an external device 662 (see FIG. 6), such as a timer or totalizer. In such an application, the control member 650 would be threaded to its lower position, as shown in FIG. 8, whereby its bore 660 would be connected to the control chamber 638 at one side of piston 636, via connection 656, tube 648 and bore 646, such that a high pressure would apply to chamber 638 by the extermal device 662 whenever sleeve 630 is to be moved to its closed position, and a low or atmospheric pressure is applied to this chamber whenever the sleeve is to be moved to its open position.

It will be appreciated that many other variations, modifications and applications of the invention may be made.

What is claimed is:

1. A backwashable filtering device including a housing having an inlet connectable to an upstream fluid pipe and an outlet connectable to a downstream fluid pipe, a filter body having an upstream surface communicating with the housing inlet to intercept dirt particles in the fluid flowing in the foreward direction from the housing inlet to the housing outlet, a backwash nozzle within the housing and having a nozzle inlet disposed adjacent to the upstream surface of the filter body, means for effecting relative movement between the filter body and the backwash nozzle, and means for connecting the backwash nozzle to the atmosphere for backwashing the filter body; characterized in that the device further includes a valve assembly movable to open or close a passage between the filter body and the housing outlet, spring means tending to move the valve assembly to close said passage, and pressure means for applying to the valve assembly the pressure at a point upstream of the valve assembly tending to move same to open said passage, whereby under low pressure conditions the valve assembly closes or restricts said passage to the outlet and thereby maintains the pressure for backwashing the filter body via the nozzle.

2. A device according to claim 1, wherein said pressure means applied to the valve assembly the pressure at a point which is downstream of the filter body and upstream of the valve assembly.

3. A device according to claim 1, wherein said housing outlet and said filter body are of coaxial tubular configuration, said passage being defined by an opening through a portion of the tubular outlet adjacent to the filter body.

4. A device according to claim 3, wherein said valve assembly includes an annular ring movable within said portion of the tubular outlet to open and close said opening therethrough.

5. A device according to claim 4, wherein said passage is defined by at least two axially-spaced circular series of openings formed through said tubular portion of the housing outlet, said valve assembly including an annular ring for each of said annular series of openings.

6. A device according to claim 3, wherein the inner surface of said filter body is radially spaced from the outer surface of the adjacent tubular portion of the housing outlet, said pressure means applying to the valve assembly the pressure in said latter space.

7. A device according to claim 1, wherein said valve assembly includes a piston having a spring bearing against one face thereof tending to move the piston to close said passage, the opposite face of the piston being exposed to the pressure at a point between the filter body and the valve assembly tending to move the valve assembly to open said passage.

8. A device according to claim 1, wherein said housing further includes a sleeve axially movable to open or close a passage between the housing inlet and the filter body.

9. A device according to claim 8, wherein said sleeve is axially movable by a manually rotatable knob coupled to the sleeve.

10. A device according to claim 9, wherein said knob is coupled to said sleeve by axial grooves formed in one received in axially recesses formed in the other, said sleeves including internal threads received on external threads on said housing.

11. A device according to claim 8, wherein said sleeve is axially movable by a piston displacable in a cylinder, the device further including means for subjecting one face of the piston to atmospheric pressure tending to move the sleeve to open the passage between the housing inlet and the filter body, a control member for subjecting the opposite face of the piston either to the housing inlet pressure tending to move the sleeve to close the said latter passage or to atmospheric pressure, and means effective to move the sleeve to open the latter passage when the control device subjects said opposite face of the piston to atmospheric pressure.

12. A device according to claim 11, wherein the housing inlet includes a conical deflector between the housing outlet and said passage from the housing inlet to deflect the fluid therethrough, said sleeve being coaxial with respect to said deflector.

13. A backwash filtering device including a housing having an inlet connectable to an upstream fluid pipe and an outlet connectable to a downstream fluid pipe, a filter body having an upstream surface communicating with the housing inlet to intercept dirt particles in the fluid flowing in the foreward direction from the housing inlet to the housing outlet, a backwash nozzle within the housing and having a nozzle inlet disposed adjacent to the upstream surface of the filter body, means for effecting relative movement between the filter body and the backwash nozzle, and means for connecting the backwash nozzle to the atmosphere for backwashing the filter body; characterized in that said housing further includes a sleeve axially movable to open or close a passage between the housing inlet and the filter body, said sleeve being axially movable by a manually rotatable knob coupled to the sleeve by axial grooves formed in one received in axial recesses formed in the other, said sleeve including internal threads received on external threads formed on said housing.

14. A backwash filtering device including a housing having an inlet connectable to an upstream fluid pipe and an outlet connectable to a downstream fluid pipe, a filter body having an upstream surface communicating with the housing inlet to intercept dirt particles in the fluid flowing in the foreward direction from the housing inlet to the housing outlet, a backwash nozzle within the housing and having a nozzle inlet disposed adjacent to the upstream surface of the filter body, means for effecting relative movement between the filter body and the backwash nozzle, and means for connecting the backwash nozzle to the atmosphere for backwashing the filter body; characterized in that said housing further includes a sleeve axially movable to open or close a passage between the housing inlet and the filter body, said sleeve being axially movable by a piston displaceable in a cylinder, the device further including means for subjecting one face of the piston to atmospheric pressure tending to move the sleeve to open the passage between the housing inlet and the filter body, a control member for subjecting the opposite face of the piston either to the housing inlet pressure tending to move the sleeve to close the said latter passage or to atmospheric pressure, and means effective to move the sleeve to open the latter passage when the control device subjects said opposite face of the piston to atmospheric pressure, said housing further including a conical deflector between the housing outlet and the passage from the housing inlet to deflect the fluid therethrough, said sleeve being coaxial with respect to said deflector.

15. A backwashable filtering device including a housing having an inlet connectable to an upstream fluid pipe, and an outlet connectable to a downstream fluid pipe, a filter body having an upstream surface communication with the housing inlet to intercept dirt particles in the fluid flowing in the foreward direction from the housing inlet to the housing outlet, a backwash nozzle within the housing and having a nozzle inlet disposed adjacent to the upstream surface of the filter body, and means for connecting the backwash nozzle to the atmosphere for backwashing the filter body said housing outlet and filter body being of coaxial tubular construction; characterized in that the device further includes a valve assembly movable to open or close a passage between the filter body and the housing outlet, which passage is defined by an opening through a portion of the tubular outlet adjacent to the filter body; said valve assembly including a valve member movable within said tubular outlet to open and close said opening therethrough, and a pressure-responsive device for moving said valve member; said filtering device further including a pressure sensor sensing the pressure drop across the filter body and effective to connect the backwash nozzle to the atmosphere for backwashing the filter body when a predetermined pressure drop is sensed, and means connecting said sensor to the pressure-responsive device said valve assembly so as to actuate same to move the valve member to close said passage upon the initiation of a backwashing operation by the sensor.

* * * * *